(12) United States Patent
Chu

(10) Patent No.: US 6,862,255 B2
(45) Date of Patent: Mar. 1, 2005

(54) METHOD FOR COORDINATING THE WRITING AND READING SPEEDS OF A CD-R/W DRIVE

(75) Inventor: Shueh-Ming Chu, Taipei (TW)

(73) Assignee: Behavior Tech Computer Corporation, Taipei (TW)

( * ) Notice: Subject to any disclaimer, the term of this patent is extended or adjusted under 35 U.S.C. 154(b) by 517 days.

(21) Appl. No.: 10/135,521

(22) Filed: May 1, 2002

(65) Prior Publication Data

US 2003/0206507 A1 Nov. 6, 2003

(51) Int. Cl.⁷ .................................................. G11B 7/00
(52) U.S. Cl. ................................. 369/47.33; 369/47.38
(58) Field of Search ........................... 369/47.32, 47.33, 369/47.34, 47.36, 47.38

(56) References Cited

U.S. PATENT DOCUMENTS 5,331,616 A * 7/1994 Morita et al. ............ 369/53.42

* cited by examiner

Primary Examiner—Nabil Hindi
(74) Attorney, Agent, or Firm—Rosenberg, Klein & Lee

(57) ABSTRACT

A method used in a CD-R/W drive for coordinating the writing and reading speeds of a CD-R/W drive is disclosed. With the aid of the method, the writing speed of the CD-R/W drive is able to be adjusted, and thus a more stable writing operation is obtained. In the method, if the time(s) that the buffer has been cleaned up is/are not larger than the predetermined value, the CD-R/W drive will write data to the CD-ROM at its highest speed. On the contrary, if the time(s) that the buffer has been cleaned up is/are larger than the predetermined value, the CD-R/W drive will slow down stepwise from the current speed to a lower speed. To accomplish the invention, the CD-R/W drive is either controlled by computer programs or by a programmably pre-written control chip that is installed in a control circuit inside the CD-R/W drive itself.

4 Claims, 2 Drawing Sheets

METHOD FOR COORDINATING THE WRITING AND READING SPEEDS OF A CD-R/W DRIVE

BACKGROUND OF THE INVENTION

1. Field of the Invention

The present invention relates to a method used in a CD-R/W drive, and more particularly to a method for coordinating the writing and reading speeds of a CD-R/W drive. The method is substantially a process which allows the CD-R/W drive to detect if the data in the buffer therein is cleaned up or not, and calculate the times that the buffer has been cleaned up. This method is utilized in the CD-R/W drives, which makes them work more efficiently.

2. Description of the Related Art

When a conventional CR-R/W drive is writing data to a blank CD-ROM, it is necessary to perform some steps for processing the signals of data, such as converting, decoding, calculating, with related software before writing to CD-ROM via signal lines of communication ports. In order to stabilize the data flow, it is necessary for the CD-R/W drive to retrieve the data from the buffer therein and write the data to the CD-ROM sequentially. Additionally, the conventional CD-R/W drive writes at its highest built-in speed to save time. However, writing suspension or even writing errors can be expected because all the data in the buffer has already been cleaned up. More time is wasted due to the above writing failure.

SUMMARY OF THE INVENTION

Thus, it is desired to have a method for coordinating the writing and reading speeds of a CD-R/W drive, which is able to solve the above problems.

An object of the present invention is to provide a method for coordinating the writing and reading speeds of a CD-R/W drive. The method is substantially a process which allows the CD-R/W drive to detect the data in the buffer of the CD-R/W drive therein is cleaned up or not, and calculate the times that the buffer has been cleaned up. Further, for more stable data writing operation, a slowing-down process is actuated to slow down the writing speed of the CD-R/W drive step by step.

The method disclosed in the present invention is substantially a process which coordinates the writing and reading speeds of a CD-R/W drive. In the method, the buffer in the CD-R/W drive is detected empty or not, and the times that the buffer has been cleaned up is calculated once a writing operation is actuated. If the time(s) that the buffer has been cleaned up has/have not reached to a predetermined value, for example, 5, the CD-R/W drive will write at its highest speed. But, if the time(s) that the buffer has been cleaned up have/has reached to a predetermined value, for example, 5, CD-R/W drive will automatically perform a slowing-down process, i.e. one step down from current speed to the next high speed. For example, the drive writing at 24× speed changes its writing speed to 20× speed for more stable writing performance.

The method is proposed to coordinate the writing and reading speeds of a CD-R/W drive. In the method, the writing and reading speeds of a CD-R/W drive are controllable by software. Alternatively, both speeds of the CD-R/W drive are controllable by a programmably pre-written chip that is installed in a control circuit inside the CD-R/W drive. In this way, the CD-R/W drive is able to accomplish the method according to the present invention.

BRIEF DESCRIPTION OF THE DRAWINGS

The present invention will be apparent to those skilled in the art by reading the following description of preferred embodiment thereof, with reference to the attached drawings in which.

DETAILED DESCRIPTION OF THE PREFERRED EMBODIMENT

Figure 1:
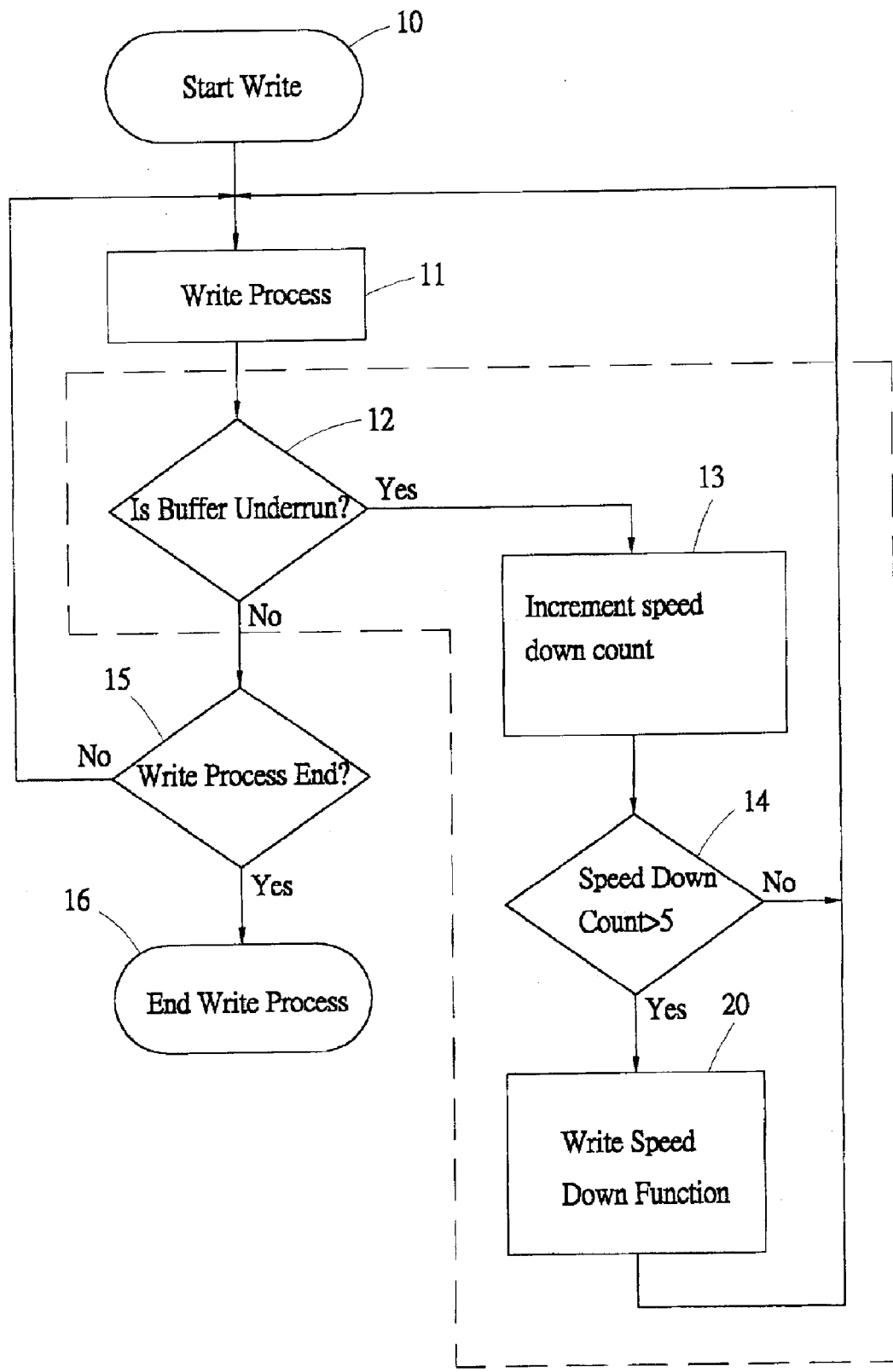
FIG. 1 is a flowchart illustrating an embodiment of a method for coordinating the writing and reading speeds of a CD-R/W drive in accordance with the present invention.
Figure 2:
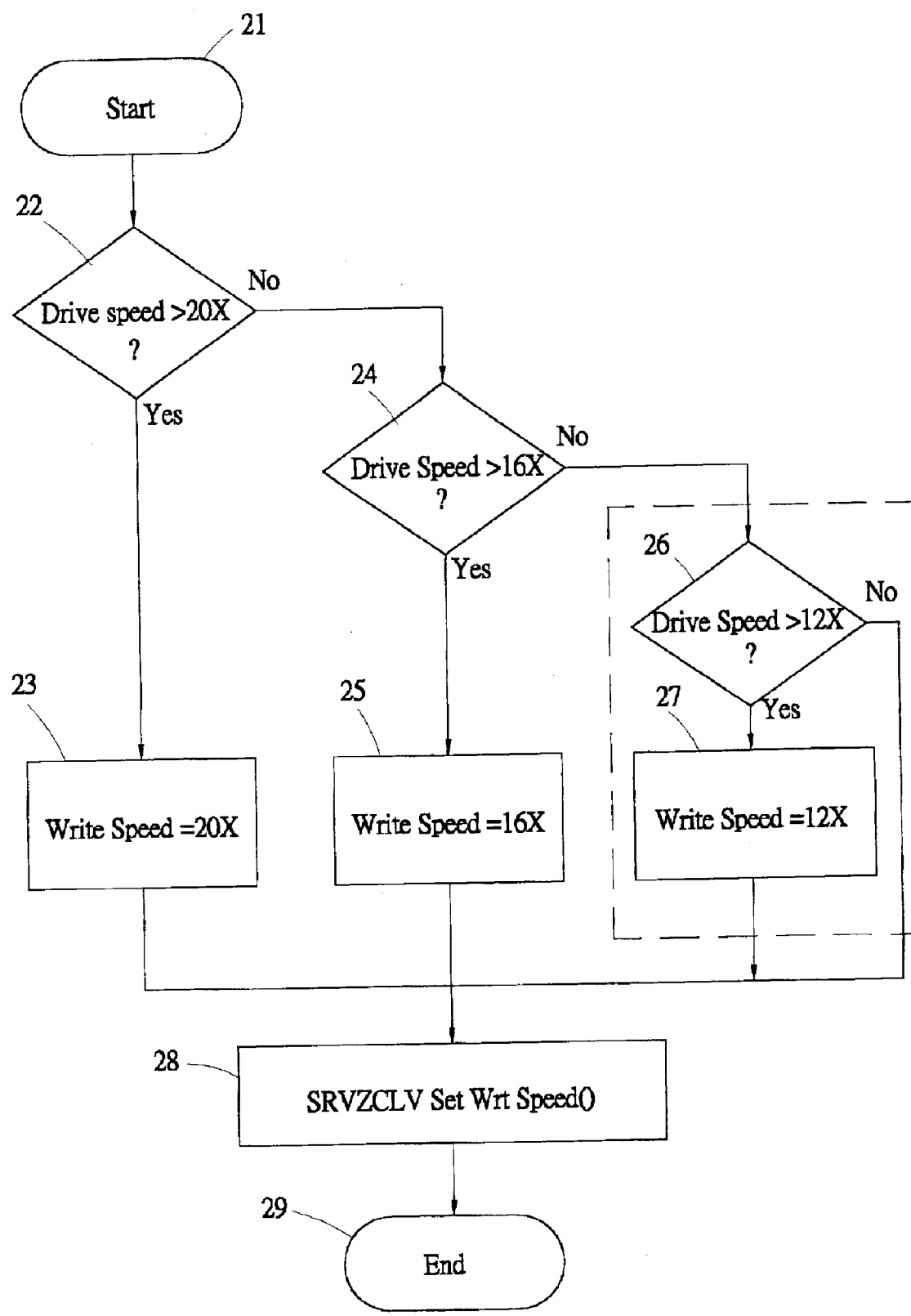
FIG. 2 is a flowchart illustrating a slowing-down process constituting the method illustrated in FIG. 1.

FIGS. 1 and 2 illustrates the method in accordance with a preferred embodiment of the present invention, which allows a CD-R/W drive to coordinate writing and reading speeds thereof. By utilizing the method, the writing speed of a CD-R/W drive can be adjusted automatically, and a stable writing operation is thus obtained.

FIG. 1 shows the method which is substantially a process for coordinating the writing and reading speeds of a CD-R/W drive. In this method, the buffer is detected empty or not, and the time(s) that the buffer has been cleaned up is/are calculated after the writing process is started. If the time(s) that the buffer has been cleaned up has/have not reached to a predetermined value, for example, 5, the CD-R/W drive will write at its highest speed. If the time(s) that the buffer has been cleaned up has/have reached to a predetermined value, a slowing-down process will be performed, and then the writing speed will be lowered stepwise, for example, from 24× to 20×.

As shown in FIG. 1, the method for coordinating the writing and reading speeds of a CD-R/W drive with a buffer comprises the steps of:

1) starting a writing process 10;
2) loading said writing process 11, and then actuating a writing operation;
3) detecting if the buffer is empty or not 12? if "true", calculating the time(s) that the buffer has been cleaned up 13;
4) determining the time(s) that the buffer has been cleaned up has/have reached to a predetermined value or not 14, for example, 5;
5) if "false", performing said writing process 10;
6) if "true" 14, performing a slowing-down process 20, and then performing said writing process 10;
7) detecting if the buffer is empty or not 12? if "false", detecting if said writing process ends or not 15; and
8) if the result being "true" 15, terminating said writing process 16; if "false", performing said writing process 11.

As shown in FIG. 2, the method shown in FIG. 1 further comprises a slowing-down process including the steps of:

1) starting a slowing-down operation 21;
2) determining if the driving speed of the CD-R/W drive is larger than 20× or not 22? if "true", performing the writing operation at 20× speed 23; if "false", detecting if the driving speed is larger than 16× speed or not 24;
3) determining if the driving speed is larger than 16× or not 24? if "true", performing the writing operation at 16× speed 25; if "false", detecting if the driving speed is larger than 12× speed or not 26;
4) determining if driving speed is larger than 12× or not 26? if "true", performing the writing operation at 12× speed 27; if "false", writing at lowest speed;

5) confirming the writing speed 28; and
6) terminating said slowing-down process 29, and performing said writing process 11.

Briefly speaking, according to the present invention, the time(s) that the buffer has been cleaned is/are automatically calculated by software. In the writing operation, once the time(s) that the buffer has been cleaned up reaches/reach to the predetermined value, the CD-R/W drive will automatically perform the slowing-down process, and thus the writing speed will be lowered stepwise. Therefore, the writing operation will be stabilized and the writing errors will be minimized.

According to the present invention, the time(s) that the buffer has been cleaned up is/are controlled by software. However, the claimed method can be accomplished either in a software fashion or a firmware one. In the former case, the CD-R/W drive is controlled by computer programs. Yet, in the latter case, the CD-R/W drive is controlled by a programmably pre-written control chip that is installed in a control circuit inside the CD-R/W drive itself.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A method for coordinating the writing and reading speeds of a CD-R/W drive having a buffer, said method comprising the steps of:
1) starting a writing process;
2) loading said writing process, and then actuating a writing operation;
3) detecting if the buffer is empty or not? if "true", calculating the time(s) that the buffer has been cleaned up;
4) determining the time(s) that the buffer has been cleaned up has/have reached to a predetermined value or not;
5) if "false", performing said writing process;
6) if "true", performing a slowing-down process, and then performing said writing process;
7) detecting if the buffer is empty or not? if "false", detecting if said writing process ends or not; and
8) if the result being "true", terminating said writing process; if "false", performing said writing process.

2. The method for coordinating the writing and reading speeds of a CD-R/W drive as claimed in claim 1, wherein said slowing-down process includes the steps of:
1) starting a slowing-down operation;
2) determining if a driving speed is larger than 20× or not? if "true", performing writing operation at 20× speed; if "false", detecting if the driving speed is larger than 16× speed or not;
3) determining if the driving speed is larger than 16× or not? if "true", performing writing operation at 16× speed; if "false", detecting if the driving speed is larger than 12× speed or not;
4) determining if driving speed is larger than 12× or not? if "true", performing writing operation at 12× speed; if "false", writing at the lowest speed;
5) confirming the writing speed; and
6) terminating said slowing-down process, and performing said writing process.

3. The method for coordinating the writing and reading speeds of a CD-R/W drive as claimed in claim 1, wherein said time(s) that the buffer has been cleaned up is/are controlled by software.

4. The method for coordinating the writing and reading speeds of a CD-R/W drive as claimed in claim 1, wherein said times that the buffer has been cleaned up are 5.

* * * * *